R. A. Filkins' Steam Valve.
Assigned to Self & W. B. Werden

71730

PATENTED DEC 3 1867

Witnesses.
Theo Tische
Wm Trewn

Inventor:
R A Filkins
Per Munn
Attorneys

United States Patent Office.

R. A. FILKINS, OF NORTH ADAMS, MASSACHUSETTS, ASSIGNOR TO HIMSELF AND W. B. WERDEN, OF WAUKEGAN, ILLINOIS.

Letters Patent No. 71,730, dated December 3, 1867.

IMPROVEMENT IN ROTARY STEAM-VALVES.

*The Schedule referred to in these Letters Patent and making part of the same.*

TO ALL WHOM IT MAY CONCERN:

Be it known that I, R. A. FILKINS, of North Adams, Berkshire county, Massachusetts, have invented a new and improved Steam-Valve; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a conical steam-valve, which has a perfectly smooth lower base or face, and which rests on a seat in which the channels for the steam-passage are arranged.

A passage is provided in the valve, which, when brought in line with the steam-pipe, connects the two parts of the same, while otherwise it can be so set that the passage will be completely or partly interrupted, as may be desired. When the passage is thus interrupted, the steam will be made to press the valve upon the seat, thereby preventing all escape, and making steam-tight joints without the use of packing of any kind.

Figure 1:
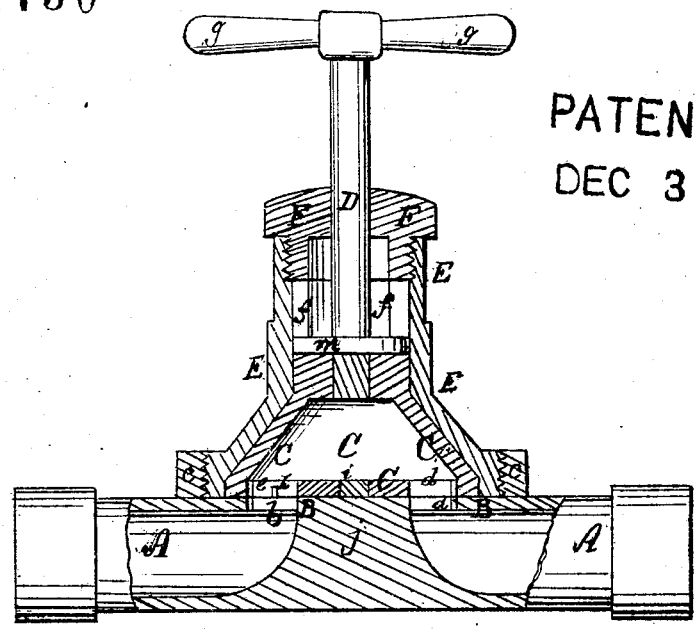
Figure 1 represents a vertical longitudinal section of my improved steam-valve.
Figure 2:
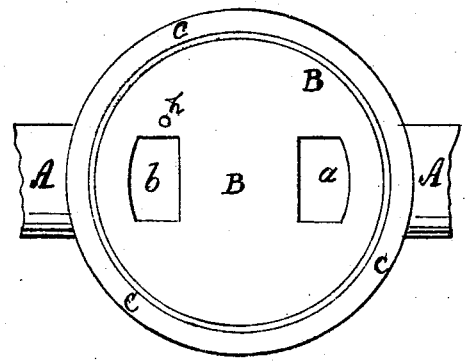
Figure 2 is a plan view of the valve-seat, the valve itself being removed.
Figure 3:
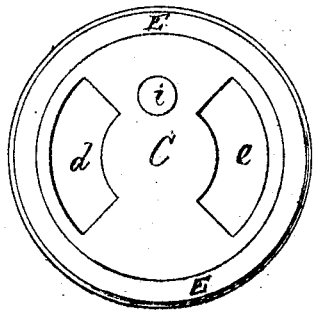
Figure 3 is an inverted plan view of the face of the same.

A represents a section of the pipe, in which the steam flows in the direction indicated by the arrows in fig. 1. B is a circular valve-seat, formed in the pipe, and communicating with the same by ports $a$ and $b$, as shown, a partition, $j$, in the pipe itself interrupting the communication. A circular flange, $c$, is formed around the seat B, and projects therefrom, as is clearly shown in figs. 1 and 2. C is the valve. The same is made in the shape of a hollow truncated cone, fitted to a vertical stem, D. The lower surface is of smaller diameter than its seat B, and is made perfectly smooth, so as to turn easily on the said seat. Two ports or holes, $d$ and $e$, are arranged in the lower face-plate of the valve, said holes being made so as to fit over the ports $a$ and $b$ respectively, when the valve is open. The valve is surrounded by a case or shell, E, which is partly conical, partly cylindrical, as shown, the conical portion surrounding the valve, while the stem D is fitted through the cylindrical portion of the valve. This shell is screwed into the flange $c$, as shown, and the further it is screwed down, the more will its conical inner face press upon the valve. The upper end of the valve itself is also cylindrical, and fits into the cylindrical part of the shell, and has a steel shoulder, $m$, on top, upon which a steel ring, $f$, rests, which is held down, and the top of the shell closed by a nut, F, as shown. The top of the stem is provided with a handle, $g$, by which the valve may be turned. A small pin, $h$, projects from the face B, through one of the ports in the lower face-plate of the valve. This pin prevents the valve from being turned too far in either direction, as it then strikes against one of the ends of the said port. When the valve is turned, so that the ports $d$ and $e$ are not above the ports $a$ and $b$, or any part thereof, then a small hole, $i$, in the face-plate of the valve, will be above the port $a$, and will admit steam into the valve, which steam cannot escape, but which will press the face-plate of the valve firmly upon its seat. By means of the nut F, the pressure of the valve upon its face-plate may be increased at pleasure.

It will be seen that this valve can be thus kept steam-tight, without the use of packing of any kind.

Another advantage is, that, for turning the valve, no screwing is needed, the valve always bearing well upon its seat, whereby also the accumulation of dirt is prevented. The higher the steam-pressure, the tighter will the valve fit on its seat when closed, as so much more force will be employed to press the valve upon the seat.

By opening the valve but partly, a smaller quantity of steam will be admitted; but the steam will not have the tendency to open the valve more when the same is partly open; on the contrary, it will tend to keep and retain the valve in any one particular position.

Having thus described my invention, what I claim as new, and desire to secure by Letters Patent, is—

The construction of the hollow conical valve C, and its arrangement with the shell E, nut F, flange $c$, partition $j$, ring $f$, shoulder $m$, and pipe A, all made and operating substantially as and for the purpose herein shown and described.

R. A. FILKINS.

Witnesses:
JAMES D. COLT,
S. W. BOWERMAN.